US011069930B2

(12) United States Patent
Tsuruta et al.

(10) Patent No.: US 11,069,930 B2
(45) Date of Patent: Jul. 20, 2021

(54) ENERGY STORAGE APPARATUS

(71) Applicant: GS Yuasa International Ltd., Kyoto (JP)

(72) Inventors: Shogo Tsuruta, Kyoto (JP); Yuichiro Yamamoto, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 319 days.

(21) Appl. No.: 15/714,125

(22) Filed: Sep. 25, 2017

(65) Prior Publication Data

US 2018/0102573 A1 Apr. 12, 2018

(30) Foreign Application Priority Data

Oct. 12, 2016 (JP) .............................. JP2016-201196

(51) Int. Cl.
*H01M 50/20* (2021.01)
*H01M 10/613* (2014.01)
*H01M 10/647* (2014.01)
*H01M 10/652* (2014.01)
*H01M 10/6557* (2014.01)
*H01M 10/6567* (2014.01)
(Continued)

(52) U.S. Cl.
CPC ....... *H01M 10/613* (2015.04); *H01M 10/482* (2013.01); *H01M 10/647* (2015.04); *H01M 10/652* (2015.04); *H01M 10/6557* (2015.04); *H01M 10/6567* (2015.04); *H01M 50/20* (2021.01); *H01M 10/425* (2013.01); *H01M 10/625* (2015.04); *H01M 50/502* (2021.01); *H01M 2220/20* (2013.01)

(58) Field of Classification Search
None
See application file for complete search history.

(56) References Cited

U.S. PATENT DOCUMENTS 3,215,304 A * 11/1965 Rohe .................... H01M 2/0439
429/176
3,623,916 A * 11/1971 Toyooka ............... H01M 2/348
429/120

(Continued)

FOREIGN PATENT DOCUMENTS

| CN | 1722504 A | 1/2006 |
| CN | 102447086 A | 5/2012 |

(Continued)

OTHER PUBLICATIONS

United States Office Action dated Sep. 27, 2019 in U.S. Appl. No. 15/763,543.

(Continued)

*Primary Examiner* — Haixia Zhang
(74) *Attorney, Agent, or Firm* — McGinn I.P. Law Group, PLLC.

(57) ABSTRACT

An energy storage apparatus including: an outer case having a bottom wall and a side wall; an energy storage device; an insulating member disposed at a position where the energy storage device is sandwiched between the bottom wall and the insulating member; a first adhesive layer which makes the insulating member and the energy storage device adhere to each other; and a second adhesive layer which makes the insulating member and the side wall adhere to each other.

20 Claims, 8 Drawing Sheets

(51) Int. Cl.
*H01M 10/48* (2006.01)
*H01M 10/42* (2006.01)
*H01M 50/502* (2021.01)
*H01M 10/625* (2014.01)

(56) References Cited

U.S. PATENT DOCUMENTS

| | | |
|---|---|---|
| 6,482,542 B1 | 11/2002 | Takaki et al. |
| 6,586,132 B1 | 7/2003 | Fukuda et al. |
| 2005/0069763 A1 | 3/2005 | Hong et al. |
| 2005/0238955 A1* | 10/2005 | Hooke ............... H01M 2/0434 429/181 |
| 2005/0282069 A1 | 12/2005 | Kim et al. |
| 2007/0037046 A1 | 2/2007 | Takahashi et al. |
| 2011/0300434 A1 | 12/2011 | Harada et al. |
| 2012/0094157 A1 | 4/2012 | Seto |
| 2013/0230746 A1 | 9/2013 | Byun |
| 2014/0335393 A1 | 11/2014 | Wada et al. |
| 2015/0188203 A1* | 7/2015 | Enomoto ........... H01M 10/6568 429/83 |
| 2015/0238955 A1 | 8/2015 | Lee et al. |
| 2016/0036029 A1 | 2/2016 | Tononishi |
| 2016/0072163 A1 | 3/2016 | Tsuruta |

FOREIGN PATENT DOCUMENTS

| | | |
|---|---|---|
| EP | 2899796 A1 | 7/2015 |
| JP | H 08-212991 A | 8/1996 |
| JP | 2001-093484 A | 4/2001 |
| JP | 2005-347233 A | 12/2005 |
| JP | 2007-048725 A | 2/2007 |
| JP | 2011-071097 A | 4/2011 |
| JP | WO2011/027383 A1 | 1/2013 |
| JP | 2013-055066 A | 3/2013 |
| JP | 2013-143271 A | 7/2013 |
| JP | 2013-157112 A | 8/2013 |
| JP | 2014-60088 A | 4/2014 |
| JP | 2014-197516 A | 10/2014 |
| JP | 2014-216195 A | 11/2014 |
| JP | WO2013/084941 A1 | 4/2015 |
| JP | 2015-106432 A | 6/2015 |
| JP | 2016-033907 A | 3/2016 |
| JP | 2016-058377 A | 4/2016 |
| KR | 2008-0058965 A | 6/2008 |

OTHER PUBLICATIONS

United States Office Action dated Aug. 14, 2020 in U.S. Appl. No. 15/763,543.

* cited by examiner

US 11,069,930 B2

ENERGY STORAGE APPARATUS

CROSS-REFERENCE TO RELATED APPLICATIONS

This application is based on Japanese Patent Application No. 2016-201196, filed on Oct. 12, 2016, the entire contents of which are hereby incorporated by reference.

FIELD

The present invention relates to an energy storage apparatus which includes an outer case, an energy storage device, and an insulating member which is disposed at a position where the energy storage device is sandwiched between the outer case and the insulating member.

BACKGROUND

Conventionally, there has been known an energy storage apparatus which includes an outer case, an energy storage device, and an insulating member which is disposed at a position where the energy storage device is sandwiched between the outer case and the insulating member, and is configured such that the energy storage device is fixed to the outer case. For example, in JP 2014-197516 A, there has been proposed an energy storage apparatus which includes: an energy storage device; an outer case having a bottom surface on a lower side of the energy storage device; and a cell frame (insulating member) disposed on an upper side of the energy storage device, wherein the energy storage device can be fixed to the outer case with uniform strength by filling a space defined between the energy storage device and the cell frame with an adhesive agent.

There may be a case where an energy storage apparatus receives vibrations, an impact or the like from the outside of the energy storage apparatus. In such a case, for preventing the inside of the energy storage apparatus from being damaged, it is important to firmly fix the energy storage device to the outer case. Also in the above-mentioned conventional energy storage apparatus, it is preferable that the energy storage device be further firmly fixed to the outer case.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus which can firmly fix the energy storage device to the outer case.

According to an aspect of the present invention, there is provided an energy storage apparatus including: an outer case having a bottom wall and a side wall; an energy storage device; an insulating member disposed at a position where the energy storage device is sandwiched between the bottom wall and the insulating member; a first adhesive layer by which the insulating member and the energy storage device are adhered to each other; and a second adhesive layer by which the insulating member and the side wall are adhered to each other.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
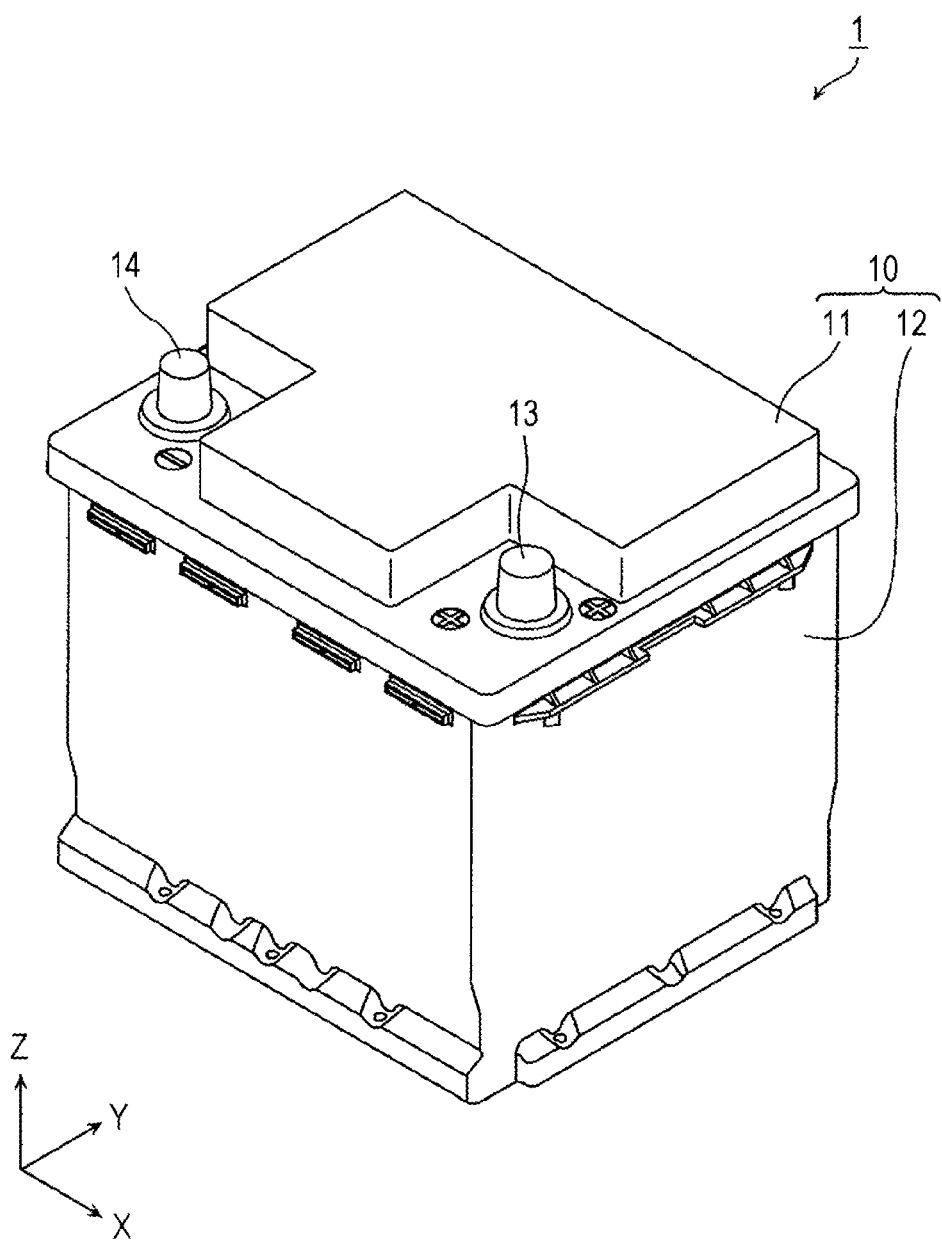
FIG. 1 is a perspective view showing an external appearance of an energy storage apparatus according to an embodiment.

According to an aspect of the present invention, there is provided an energy storage apparatus including: an outer case having a bottom wall and a side wall; an energy storage device; an insulating member disposed at a position where the energy storage device is sandwiched between the bottom wall and the insulating member; a first adhesive layer by which the insulating member and the energy storage device are adhered to each other; and a second adhesive layer by which the insulating member and the side wall are adhered to each other.

In the energy storage apparatus, the energy storage device is disposed at the position where the energy storage device is sandwiched between the bottom wall of the outer case and the insulating member, the insulating member and the energy storage device are adhered to each other by the first adhesive layer, and the insulating member and the side wall of the outer case are adhered to each other by the second adhesive layer. With such a configuration, the energy storage device is adhered to the outer case by way of the insulating member in a state where the energy storage device is sandwiched by the outer case and the insulating member. Thus, the energy storage device can be firmly fixed to the outer case.

The energy storage apparatus may further include a third adhesive layer by which the bottom wall and the energy storage device are adhered to each other.

With such a configuration, the bottom wall of the outer case and the energy storage device are adhered to each other by the third adhesive layer and hence, the energy storage device, the outer case and the insulating member can be fixed to each other. Accordingly, the energy storage device can be firmly fixed to the outer case.

The energy storage apparatus may further include at least either a printed circuit board or a bus bar, and at least either the printed circuit board or the bus bar may be fixed to the insulating member.

With such a configuration, at least either the printed circuit board or the bus bar is fixed to the insulating member and hence, it is possible to prevent the movement of at least either the printed circuit board or the bus bar in the inside of the outer case. Accordingly, the occurrence of electric disconnection with respect to at least either the printed circuit board or the bus bar can be prevented.

An outer periphery of the insulating member and an inner periphery of the side wall may be adhered to each other by the second adhesive layer.

With such a configuration, the outer periphery of the insulating member and the inner periphery of the side wall of the outer case are adhered to each other and hence, the outer case and the insulating member can be firmly fixed to each other. Accordingly, the energy storage device can be firmly fixed to the outer case.

The side wall may have a recessed portion in which the insulating member is fitted, and the recessed portion and the insulating member may be adhered to each other by the second adhesive layer.

With such a configuration, the outer case and the insulating member are adhered to each other in a state where the insulating member is fitted in the recessed portion of the side wall of the outer case and hence, the side wall of the outer case and the insulating member can be firmly fixed to each other. Accordingly, the energy storage device can be firmly fixed to the outer case.

The recessed portion may be formed on an inner surface of the side wall.

With such a configuration, the recessed portion of the side wall of the outer case is formed on the inner surface of the side wall and hence, it is possible to prevent the second adhesive layer which is a portion where the side wall of the outer case and the insulating member are adhered to each other from being exposed to the outside. Accordingly, it is possible to suppress the lowering of gas-tightness at the second adhesive layer.

The recessed portion may have a groove portion which accommodates the second adhesive layer.

With such a configuration, the recessed portion of the side wall of the outer case has the groove portion which accommodates the second adhesive layer and hence, for example, even when an adhesive agent having low viscosity is used as the second adhesive layer, the adhesive agent flows down to the groove portion. Accordingly, it is possible to prevent the adhesive agent from flowing out from the recessed portion.

The insulating member may have a first projecting portion which projects toward the energy storage device and is brought into contact with the energy storage device at a position adjacent to the first adhesive layer.

With such a configuration, the insulating member has the first projecting portion which is brought into contact with the energy storage device at a position adjacent to the first adhesive layer. By forming the first projecting portion such that a projection amount of the first projecting portion is set to an optimum value of a thickness of the first adhesive layer, the first adhesive layer can be maintained at an optimum thickness.

The energy storage apparatus may include a plurality of the energy storage devices and a partition portion disposed between the plurality of energy storage devices, and the insulating member may have a second projecting portion which projects toward the partition portion, and the partition portion may be fixed to the second projecting portion.

With such a configuration, the partition portion between the energy storage devices and the second projecting portion of the insulating member are fixed to each other and hence, it is possible to prevent contact between the energy storage devices. Accordingly, provided that the partition portion and the second projecting portion have an insulation property, the occurrence of shirt-circuiting between the energy storage devices can be prevented. Further, provided that the partition portion and the second projecting portion have a heat insulation property, the transfer of heat between the energy storage devices can be prevented.

The energy storage device may include at least either an electrode terminal or a gas release valve, and the first adhesive layer may be disposed at a position different from a position of at least either the electrode terminal or the gas release valve.

With such a configuration, the first adhesive layer is disposed at the position different from the position of at least either the electrode terminal or the gas release valve which the energy storage device has and hence, it is possible to prevent the first adhesive layer from impairing a function of the electrode terminal and a function of the gas release valve.

The insulating member and the energy storage device are adhered to each other in a first direction by the first adhesive layer, and the insulating member and the side wall are adhered to each other in a second direction which differs from the first direction by the second adhesive layer.

In a configuration where adhesions are made only in the same direction, the adhesions are easily dissolved when vibrations or an impact are/is applied in the same direction. Accordingly, by making the direction of adhesion between the insulating member and the energy storage device and the direction of adhesion between the insulating member and the outer case different from each other, the adhesions are minimally dissolved. Accordingly, the energy storage devices can be firmly fixed to the outer case.

According to the energy storage apparatus of the present invention, the energy storage devices can be firmly fixed to the outer case.

Hereinafter, an energy storage apparatus according to an embodiment of the present invention and modifications of the embodiment are described with reference to drawings. The embodiment and the modifications of the embodiment described hereinafter are comprehensive or specific examples of the present invention. In the embodiment described hereinafter, numerical values, shapes, materials, constitutional elements, the arrangement positions and connection states of the constitutional elements and the like are merely examples, and these are not intended to be used for limiting the present invention. Further, out of the constitutional elements in the embodiment and the modifications of the embodiment described hereinafter, the constitutional elements which are not described in independent claims describing an uppermost concept of the present invention are described as arbitrary constitutional elements. In the respective drawings, the respective constitutional elements are not always described strictly accurate in size or the like.

In the following description and drawings, an arrangement direction of the energy storage devices, a direction in which long-side surfaces of a container of the energy storage device opposedly face each other, or a thickness direction of the container is defined as an X axis direction. An arrangement direction of electrode terminals in one energy storage device or a direction in which short-side surfaces of the container of the energy storage device opposedly face each other is defined as a Y axis direction. Further, an arrangement direction of an outer case body and a lid of the energy storage apparatus, an arrangement direction of a container body and a lid of the energy storage device, or a vertical direction is defined as a Z axis direction. These X axis direction, Y axis direction and Z axis direction are directions intersecting with each other (orthogonal to each other in this embodiment). There may be also a case where the Z axis direction is not the vertical direction depending on a mode of use. However, hereinafter, for the sake of convenience of description, the description is made using the Z axis direction as the vertical direction. In the description made hereinafter, for example, a plus side in the X axis direction indicates an arrow direction side in an X axis, and a minus side in the X axis direction indicates a side opposite to the plus side in the X axis direction. The same goes for the Y axis direction and the Z axis direction.

EMBODIMENT

Figure 2:
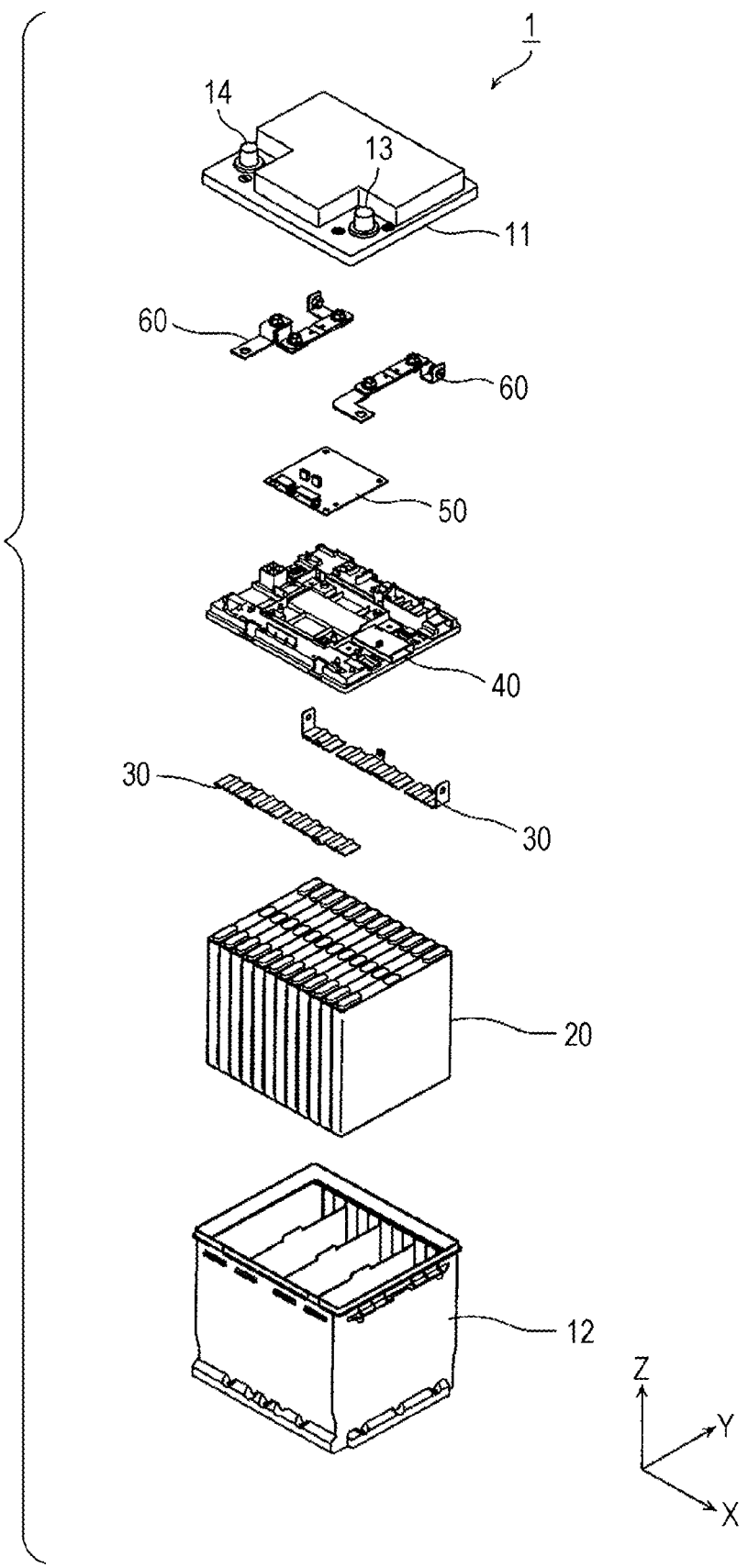
FIG. 2 is an exploded perspective view showing respective constitutional elements in a disassembled state.

First, the entire configuration of an energy storage apparatus 1 according to this embodiment is described with reference to FIG. 1 and FIG. 2. FIG. 1 is a perspective view showing an external appearance of the energy storage apparatus 1 according to this embodiment. FIG. 2 is an exploded perspective view showing respective constitutional elements when the energy storage apparatus 1 according to this embodiment is in a disassembled state.

The energy storage apparatus 1 is an apparatus which can be charged with electricity from the outside of the energy storage apparatus 1 therein or can discharge electricity to the outside of the energy storage apparatus 1. For example, the energy storage apparatus 1 is a battery module used for power storage application, power source application or the like. More specifically, the energy storage apparatus 1 is used as an engine starting battery for a mobile body such as an automobile such as an electric vehicle (EV), a hybrid electric vehicle (HEV) or a plug-in hybrid electric vehicle (PHEV), a motorcycle, a watercraft, a snowmobile, an agricultural machine or a construction machine, for example.

As shown in FIG. 1 and FIG. 2, the energy storage apparatus 1 includes an outer case 10 formed of a first outer case 11 and a second outer case 12, and a plurality of energy storage devices 20, a plurality of bus bars 30, 60, a holding member 40 and a printed circuit board 50 which are accommodated inward the outer case 10.

The outer case 10 is a rectangular-shaped (box-shaped) container (module case) which forms an outer case of the energy storage apparatus 1. That is, the outer case 10 is disposed outward the plurality of energy storage devices 20, the bus bars 30, 60, the holding member 40, the printed circuit board 50 and the like, and these energy storage devices 20 and the like are disposed at predetermined positions in the outer case 10 and hence, the outer case 10 protects the energy storage devices 20 and the like from an impact or the like. For example, the outer case 10 is made of an insulating material such as polycarbonate (PC), polypropylene (PP), polyethylene (PE), a polyphenylene sulfide resin (PPS), polybutylene terephthalate (PBT) or an ABS resin. With such a configuration, the outer case 10 prevents the energy storage devices 20 and the like from being brought into contact with a metal member or the like disposed outside the outer case 10.

In this embodiment, the outer case 10 includes the first outer case 11 which forms a lid body (outer lid) of the outer case 10, and the second outer case 12 which forms a body of the outer case 10. The first outer case 11 is a flat rectangular-shaped cover member which closes an opening of the second outer case 12, and a positive electrode external terminal 13 and a negative electrode external terminal 14 are mounted on the first outer case 11. The energy storage apparatus 1 is charged with electricity therein from the outside of the energy storage apparatus 1 and discharges electricity to the outside of the energy storage apparatus 1 through the positive electrode external terminal 13 and the negative electrode external terminal 14. The second outer case 12 is a housing having a bottomed rectangular cylindrical shape in which an opening is formed, and the second outer case 12 accommodates the plurality of energy storage devices 20, the bus bars 30, the printed circuit board 50 and the like therein. The first outer case 11 and the second outer case 12 may be made of the same material, or may be made of different materials. A configuration of the second outer case 12 is described in detail later.

The energy storage device 20 is a secondary battery (battery cell) which can be charged with or discharge electricity. More specifically, the energy storage device 20 is a nonaqueous electrolyte secondary battery such as a lithium ion secondary battery. The energy storage device 20 has a flat rectangular parallelepiped shape (prismatic shape) and, in this embodiment, twelve energy storage devices 20 are arranged in a row in the X axis direction. A shape of the energy storage device 20 and the number of energy storage devices 20 to be arranged are not limited. The energy storage device 20 is not limited to the nonaqueous electrolyte secondary battery, and may be a secondary battery other than the nonaqueous electrolyte secondary battery or may be a capacitor. Further, the energy storage device 20 may be a primary battery which can use stored electricity without being charged by a user. A configuration of the energy storage device 20 is described in detail later.

The bus bars 30 are rectangular plate-like members which are disposed above the plurality of energy storage devices 20 and electrically connect the plurality of energy storage devices 20 to each other. The bus bars 30 are formed of a conductive member made of metal such as copper, a copper alloy, aluminum, or an aluminum alloy, for example. More specifically, out of the energy storage devices 20 disposed adjacently to each other, the bus bar 30 connects a positive electrode terminal or a negative electrode terminal of one energy storage device 20 and a positive electrode terminal or a negative electrode terminal of the other energy storage device 20 to each other. In this embodiment, four sets of energy storage device groups are formed by connecting three energy storage devices 20 to each other in parallel as one set of energy storage device group by the bus bars 30, and four sets of energy storage device groups are connected to each other in series. The bus bars 30 may be configured to connect all twelve energy storage devices 20 to each other in series, or may adopt other configurations.

The bus bars 60 are conductive members which are placed on the holding member 40, and are fixed to the holding member 40. The bus bars 60 electrically connect the bus bars 30 and the positive electrode external terminal 13 and the negative electrode external terminal 14 mounted on the first outer case 11 to each other. The bus bars 60 are made of copper, a copper alloy, aluminum, or an aluminum alloy or the like, for example. More specifically, out of the plurality of energy storage devices 20 provided to the energy storage apparatus 1, one bus bar 60 connects the positive electrode terminals of three energy storage devices 20 disposed on a positive electrode external terminal 13 side (a plus side in the X axis direction in FIG. 2) and the positive electrode external terminal 13 to each other. Out of the plurality of energy storage devices 20, the other bus bar 60 connects the negative electrode terminals of three energy storage devices 20 disposed on a negative electrode external terminal 14 side (a minus side in the X axis direction in FIG. 2) and the negative electrode external terminal 14 to each other.

The printed circuit board 50 is a control printed circuit board which is placed on the holding member 40 and is fixed to the holding member 40. The printed circuit board 50 is connected to the plurality of energy storage devices 20 by wirings or the like. The printed circuit board 50 acquires, monitors, and controls states of the plurality of energy storage devices 20. More specifically, a control circuit (not shown) is mounted on the printed circuit board 50, and the control circuit acquires various kinds of information such as charging states and discharging states, voltage values, current values, and temperatures of the plurality of energy storage devices 20, controls ON and OFF of relays, and performs communication with other equipment.

The holding member 40 is an electric equipment tray which can hold electric equipment such as the printed circuit board 50, the bus bars 60, and other relays, and wirings (not shown) thereon, can provide insulation between the printed circuit board 50, the bus bars 60 and the like and other members, and can restrict the positions of the printed circuit board 50, the bus bars 60 and the like. The holding member 40 is disposed inward the outer case 10 at a position which is below the first outer case 11 (outer lid) and where the holding member 40 covers the energy storage devices 20 from above and hence, the holding member 40 also has a function as an inner lid of the outer case 10. The holding member 40 is made of an insulating material such as PC, PP, PE, PPS, PBT, an ABS resin or the like, for example. That is, the holding member 40 is included in the "insulating member" in Claim.

More specifically, the holding member 40 is placed on an upper side (a plus side in the Z axis direction) of the energy storage devices 20 and the bus bars 30, and is positioned with respect to the energy storage devices 20 and the bus bars 30. That is, the holding member 40 is disposed at a position where the holding member 40 sandwiches the energy storage devices 20 with a bottom wall 15 of a second outer case 12 described later. The printed circuit board 50, the bus bars 60 and the like are positioned by being placed on the holding member 40. Further, the first outer case 11 is positioned by being disposed on the holding member 40. With such a configuration, the printed circuit board 50 is connected to the wirings and the like in a state where the printed circuit board 50 is positioned with respect to the wirings, and the bus bars 60 are connected to the bus bars 30, the positive electrode external terminal 13, and the negative electrode external terminal 14 in a state where the bus bars 60 are positioned with respect to the bus bars 30, the positive electrode external terminal 13, and the negative electrode external terminal 14. A configuration of the holding member 40 is described in detail later.

Figure 3:
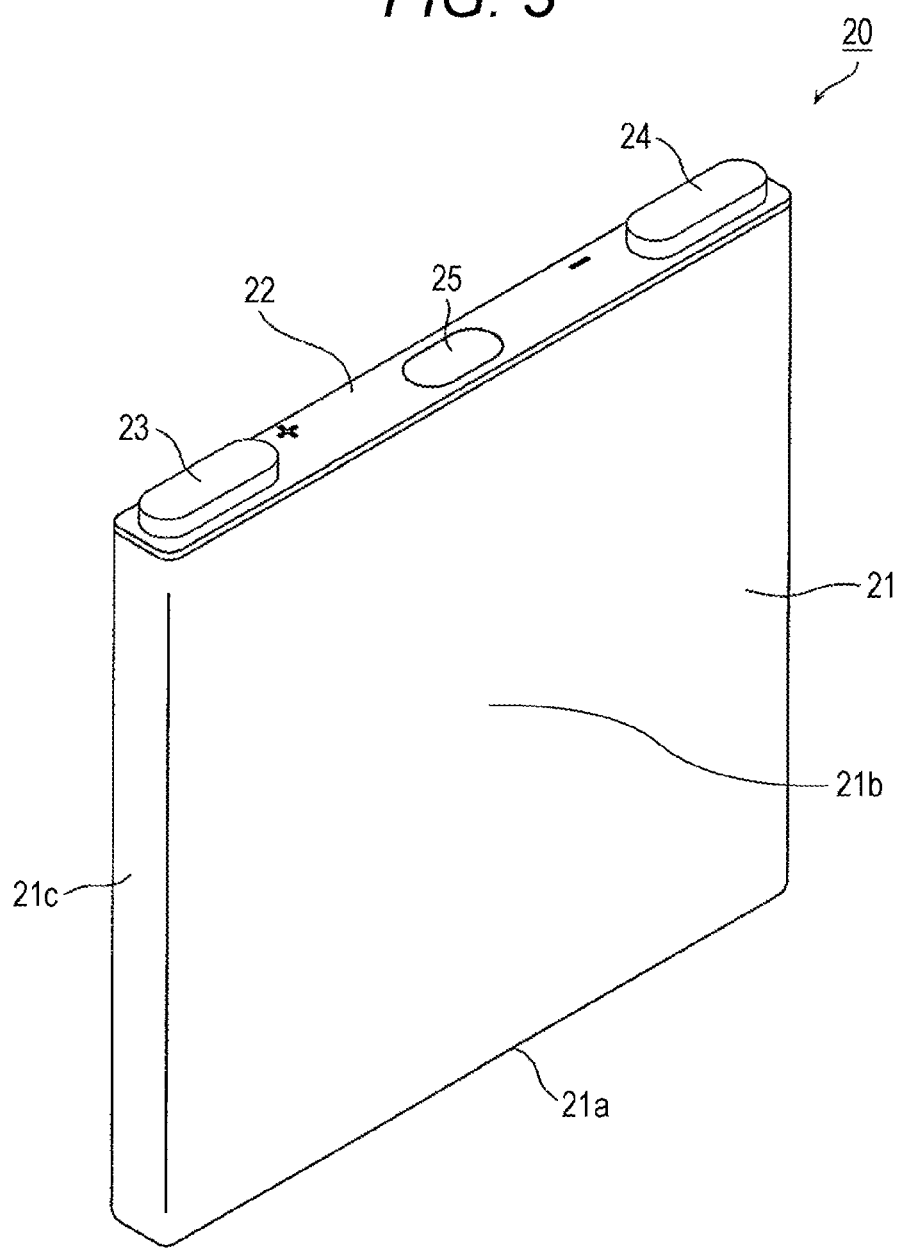
FIG. 3 is a perspective view showing an external appearance of an energy storage device.

Next, a configuration of the energy storage device 20 is described in detail. FIG. 3 is a perspective view showing an external appearance of the energy storage device 20 according to this embodiment. More specifically, FIG. 3 is a perspective view when one energy storage device 20 out of the plurality of energy storage devices 20 shown in FIG. 2 is viewed from an oblique upper side.

As shown in FIG. 3, the energy storage device 20 includes a container 21, a positive electrode terminal 23, and a negative electrode terminal 24. Inward the container 21, an electrode assembly (also referred to as an energy storage element or a power generating element), a positive electrode current collector, a negative electrode current collector and the like are disposed, and a liquid such as an electrolyte solution (nonaqueous electrolyte) or the like is sealed in the container 21. However, these components are omitted in the drawing, and the detailed description of these components is also omitted.

The container 21 is a rectangular-parallelepiped (prismatic) container having a rectangular-shaped bottom surface portion 21a on a minus side in the Z axis direction in FIG. 3, rectangular-shaped long-side surface portions 21b which form side surfaces of the container 21 on both sides in the X axis direction, rectangular-shaped short-side surface portions 21c which form side surfaces of the container 21 on both sides in the Y axis direction, and a rectangular-shaped container lid portion 22 on a plus side in the Z axis direction in FIG. 3. That is, the container 21 forms a container body having a bottomed rectangular cylindrical shape by the bottom surface portion 21a, two long-side surface portions 21b, and two short-side surface portions 21c, and the container lid portion 22 closes an opening of the container body. More specifically, the container 21 is configured such that by joining the container body and the container lid portion 22 to each other by welding or the like after the electrode assembly and the like are accommodated inward the container body, the inside of the container 21 can be sealed.

A gas release valve 25 is mounted on a center portion of the container lid portion 22 in the Y axis direction. The gas release valve 25 is a safety valve for releasing a pressure by discharging a gas when a gas is generated in the container 21 so that a pressure in the container 21 is increased. Although a material for forming the container 21 (the container body and the container lid portion 22) is not particularly limited, it is preferable that the container 21 is made of weldable metal such as stainless steel, aluminum, an aluminum alloy or the like, for example.

The positive electrode terminal 23 is a metal-made electrode terminal which is electrically connected to a positive electrode of the electrode assembly through the positive electrode current collector, and the negative electrode terminal 24 is a metal-made electrode terminal which is electrically connected to a negative electrode of the electrode assembly through the negative electrode current collector. Both the positive electrode terminal 23 and the negative electrode terminal 24 are mounted on the container lid portion 22. In this embodiment, the energy storage device 20 is disposed in a state where the container lid portion 22 (the positive electrode terminal 23, the negative electrode terminal 24, and the gas release valve 25) is directed upward.

Figure 4:
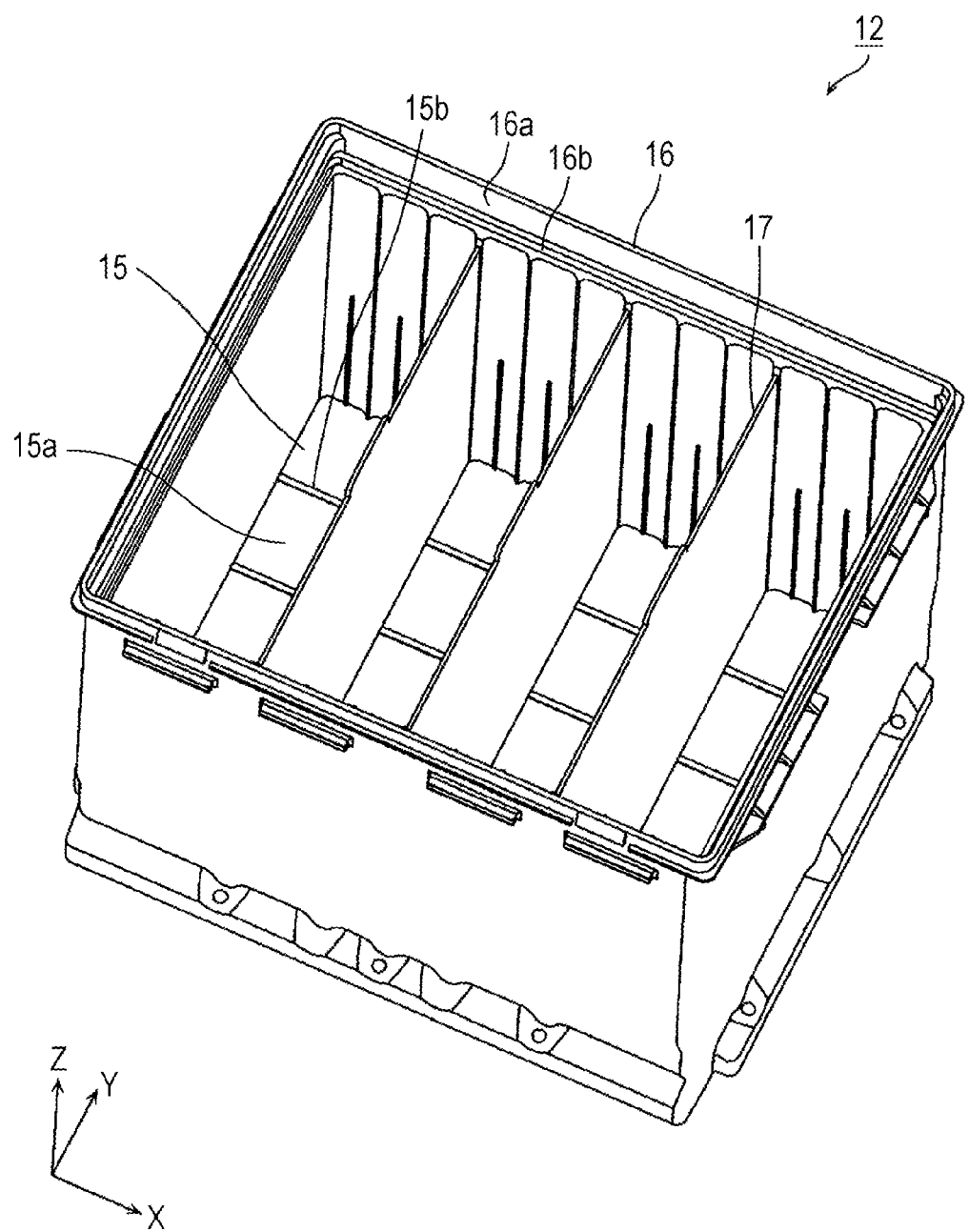
FIG. 4 is a perspective view showing a configuration of a second outer case.

Next, a configuration of the second outer case 12 is described in detail. FIG. 4 is a perspective view showing a configuration of the second outer case 12 according to this embodiment. More specifically, FIG. 4 is a perspective view when the second outer case 12 shown in FIG. 2 is viewed from an oblique upper side.

As shown in FIG. 4, the second outer case 12 has a bottom wall 15 disposed on a minus side in the Z axis direction, and a side wall 16 disposed on both sides in the X axis direction and on both sides in the Y axis direction. The bottom wall 15 is a rectangular flat plate-like portion which forms a bottom wall of the second outer case 12. The side wall 16 is a rectangular flat plate-like portion which is raised from four sides of an outer edge of the bottom wall 15 and forms a side wall of the second outer case 12. That is, the second outer case 12 is a bottomed rectangular cylindrical member which is formed of the bottom wall 15 and the side wall 16 which surrounds four sides of the bottom wall 15, and has an opening on an upper portion thereof.

Bottom wall projecting portions 15b which are elongated ribs projecting from an inner surface 15a and extending in the X axis direction are formed on the bottom wall 15. More specifically, four bottom wall projecting portions 15b which are arranged parallel to each other in the Y axis direction at substantially equal intervals are formed on the bottom wall 15. The bottom wall projecting portion 15b is a portion which is disposed on the side of a third adhesive layer 73 described later, projects toward the energy storage device 20, and is brought into contact with the energy storage device 20. A configuration where the bottom wall projecting portion 15b is brought into contact with the energy storage device 20 is described in detail later.

The side wall 16 has a side wall recessed portion 16a into which the holding member 40 is fitted. The side wall recessed portion 16a is a recessed portion formed on an inner surface of the side wall 16. More specifically, the side wall recessed portion 16a is an annular portion formed on an end portion of the side wall 16 on a plus side in the Z axis direction over the whole circumference of the inner surface. The side wall recessed portion 16a has a groove portion 16b. The groove portion 16b is a groove having a rectangular shape in cross section which is formed in a recessed manner toward a minus side in the Z axis direction over the whole circumference of the side wall recessed portion 16a, and a second adhesive layer 72 described later is accommodated in the groove portion 16b. The side wall recessed portion 16a may not be formed on the whole circumference of the side wall 16 and may be formed on a portion of the whole circumference of the side wall 16. The groove portion 16b may not be formed on the whole circumference of the side wall recessed portion 16a and may be formed on a portion of the whole circumference of the side wall recessed portion 16a. A cross-sectional shape of the groove portion 16b is not limited to a rectangular shape, and may be formed into any shape such as polygonal shapes other than a rectangular shape, a semicircular shape, a semi elongated circular shape, a semi elliptical shape.

The second outer case 12 further includes partition portions 17 inward thereof. The partition portions 17 are members disposed between the plurality of energy storage devices 20. More specifically, each of the partition portions 17 is a rectangular flat-plate-like partition plate, and the partition portions 17 are disposed in the inside of the second outer case 12 in such a manner that the partition portions 17 are connected with the inner surface 15a of the bottom wall 15 and the inner surface of the side wall 16 on both sides in the Y axis direction, and partition a space in the second outer case 12. In this embodiment, three partition portions 17 are disposed such that each partition portion 17 is disposed between each two energy storage device groups among four energy storage device groups (each energy storage device group formed of three energy storage devices 20 connected to each other in parallel). That is, the partition portions 17 are disposed between the energy storage device groups which are connected to each other in series and hence, the partition portion 17 has a function of preventing the energy storage device groups from coming into contact with each other thus providing electrical insulation and heat insulation between the energy storage device groups.

In this embodiment, the second outer case 12 is an integrally molded product where the bottom wall 15, the side wall 16 and the partition portions 17 are integrally formed with each other. However, any one of the bottom wall 15, the side wall 16 and the partition portions 17 may be formed as a part separate from other parts. Further, all of the parts formed of the bottom wall 15, the side wall 16 and the partition portions 17 may not be made of the same material, and any one of the bottom wall 15, the side wall 16 and the partition portions 17 may be made of a material different from a material for forming other parts.

Figure 5:
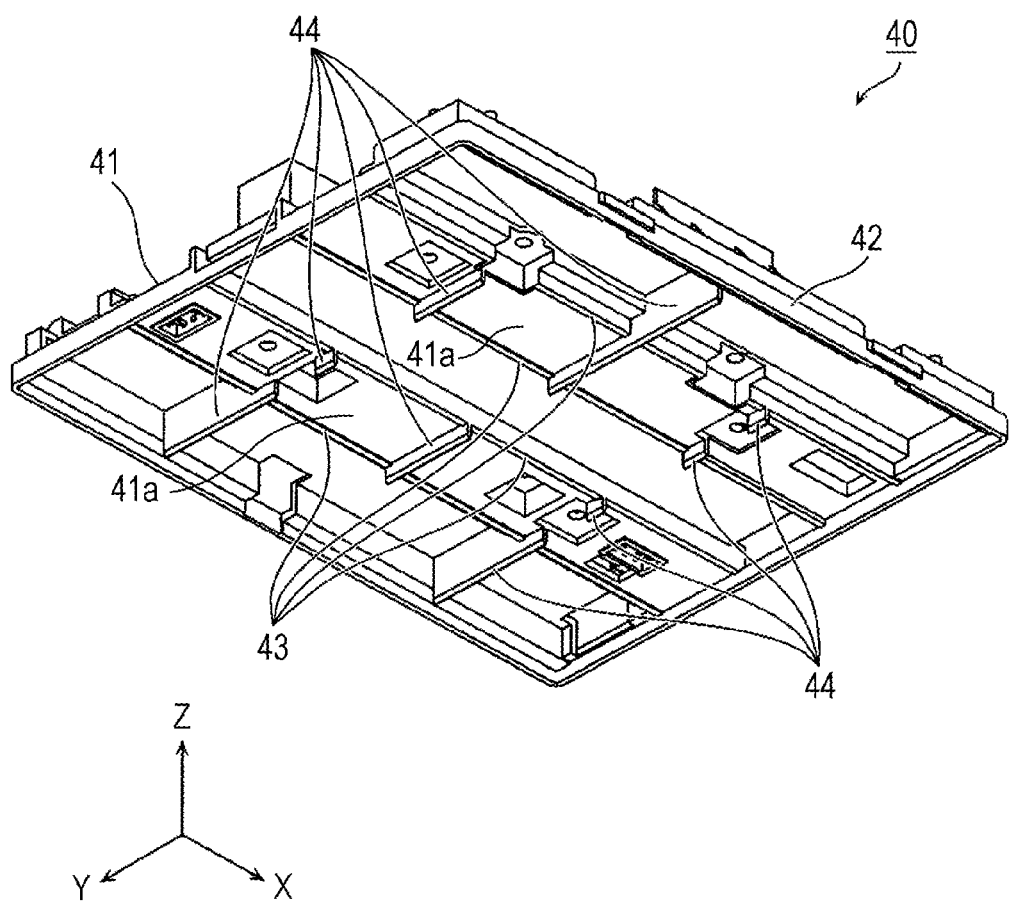
FIG. 5 is a perspective view showing a configuration of a holding member.

Next, a configuration of the holding member 40 is described in detail. FIG. 5 is a perspective view showing the configuration of the holding member 40 according to this embodiment. More specifically, FIG. 5 is a perspective view when the holding member 40 shown in FIG. 2 is viewed from an oblique lower side.

As shown in FIG. 5, the holding member 40 includes a holding member body 41, and a holding member outer peripheral portion 42 which is disposed on an outer periphery of the holding member body 41. The holding member body 41 is a rectangular flat-plate-like portion which forms a body of the holding member 40. The holding member outer peripheral portion 42 is a flat-plate-like annular portion which projects downward (toward a minus side in the Z axis direction) from four sides of an outer edge of the holding member body 41 and extends over the whole circumference of the outer periphery of the holding member body 41. The holding member outer peripheral portion 42 is fitted in the side wall recessed portion 16a of the second outer case 12. A configuration where the holding member outer peripheral portion 42 is fitted in the side wall recessed portion 16a of the second outer case 12 is described in detail later.

On the holding member body 41, first projecting portions 43 each of which is formed of an elongated rib projecting from the inner surface 41a and extending in an arrangement direction of the energy storage devices 20 (X axis direction) are formed. More specifically, on the holding member body 41, four first projecting portions 43 arranged parallel to each other in the Y axis direction are formed. Each first projecting portion 43 is a portion disposed on the side of a first adhesive layer 71 described later, projecting toward the energy storage devices 20, and brought into contact with the energy storage devices 20. The first projecting portions 43 are disposed at positions where the first projecting portions 43 are not brought into contact with the electrode terminals (the positive electrode terminals 23 and the negative electrode terminals 24) and the gas release valves 25 of the energy storage devices 20. A configuration where the first projecting portions 43 are brought into contact with the energy storage devices 20 is described in detail later.

On the holding member body 41, further, a plurality of second projecting portions 44 each of which is formed of an elongated rib projecting from the inner surface 41a and extending along the partition portion 17 (in the Y axis direction) are formed. The second projecting portions 44 are plate-like portions having the larger projection height than the first projecting portions 43, project toward the partition portion 17 of the second outer case 12, and are fixed to the partition portion 17. A configuration where the second projecting portions 44 are fixed to the partition portion 17 is described in detail later.

Figure 6:
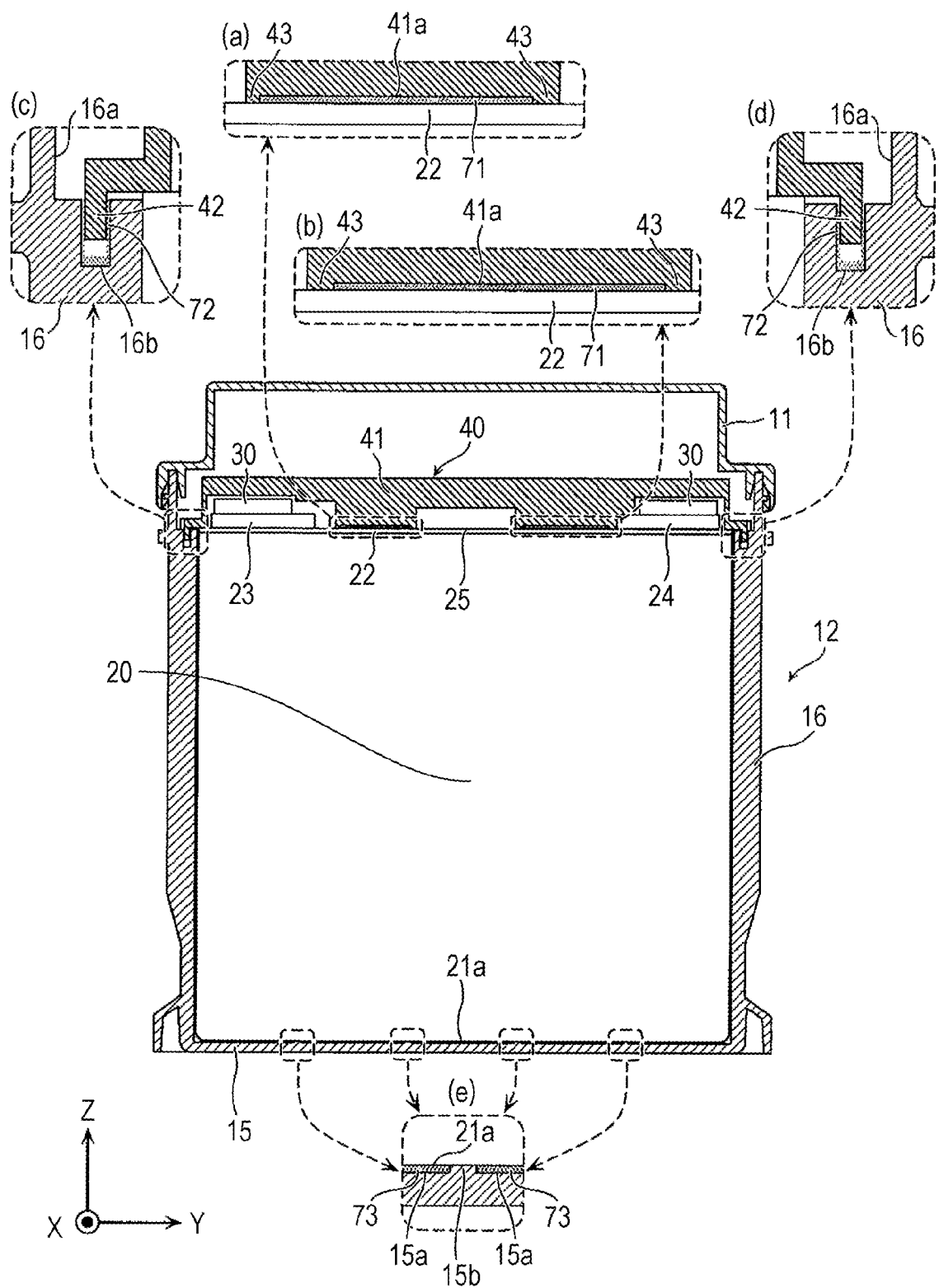
FIG. 6 is a cross-sectional view showing a first adhesive layer, a second adhesive layer, and a third adhesive layer.

Next, a configuration where the energy storage devices 20, the second outer case 12, and the holding member 40 are adhered to each other is described in detail. FIG. 6 and FIG.

Figure 7:
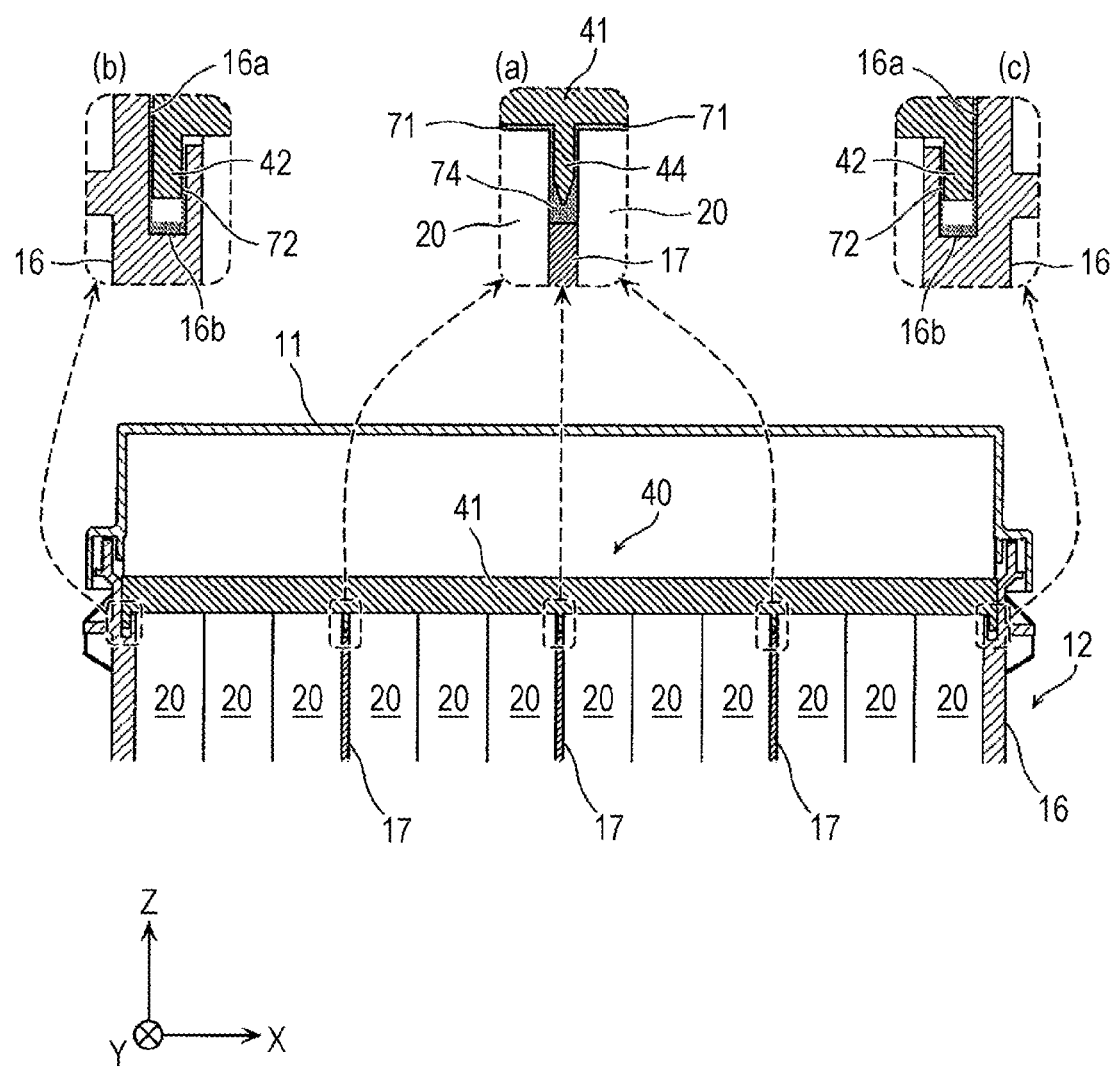
FIG. 7 is a cross-sectional view showing the first adhesive layer, the second adhesive layer, and a fourth adhesive layer.

7 are cross-sectional views showing a configuration where the energy storage devices 20, the second outer case 12, and the holding member 40 according to this embodiment are adhered to each other. More specifically, FIG. 6 is a cross-sectional view showing a configuration of the energy storage apparatus 1 when a cross section of the energy storage apparatus 1 shown in FIG. 1 is taken along a plane parallel to a YZ plane, wherein the first adhesive layer 71 ((a) and (b) in FIG. 6) and a second adhesive layer 72 ((c) and (d) in FIG. 6), and the third adhesive layer 73 ((e) in FIG. 6) are shown. FIG. 7 is a cross-sectional view showing a configuration of the energy storage apparatus 1 when a cross section of the energy storage apparatus 1 shown in FIG. 1 is taken along a plane parallel to an XZ plane, wherein the first adhesive layer 71 and a fourth adhesive layer 74 ((a) in FIG. 7) and the second adhesive layer 72 ((b) and (c) in FIG. 7) are shown.

Firstly, as shown in (a) and (b) in FIG. 6 and (a) in FIG. 7, the first adhesive layer 71 is disposed between the holding member 40 and the energy storage devices 20. The first adhesive layer 71 is a layer made of an adhesive agent for adhering the holding member 40 and the energy storage devices 20 to each other. As the adhesive agent used for the first adhesive layer 71, a resin-made material which is in a liquid form before adhesion and performs adhesion when solidified can be used. Alternatively, as the adhesive agent, an adhesive agent which is in a gel form before adhesion, an adhesive agent in a solid form such as a hot melt adhesive agent or the like can be used.

More specifically, as shown in (a) and (b) in FIG. 6, the first adhesive layer 71 is disposed between the inner surface 41a of the holding member body 41 of the holding member 40, the first projecting portions 43, and an upper surface of the container lid portion 22 of the energy storage device 20, and fixes the holding member body 41 and the container lid portion 22 to each other by adhesion. That is, an adhesive agent is disposed between the holding member body 41 and the container lid portion 22, and the adhesive agent is solidified in a state where the first projecting portions 43 are brought into contact with the container lid portion 22 so that the first adhesive layer 71 is formed. With such a configuration, the holding member 40 and the energy storage device 20 are adhered to each other by the first adhesive layer 71 in a first direction (in this embodiment, Z axis direction).

The first adhesive layer 71 is disposed at a position different from positions of both the electrode terminals and the gas release valve 25 of the energy storage device 20. That is, two first projecting portions 43 are disposed between the positive electrode terminal 23 and the gas release valve 25 and between the negative electrode terminal 24 and the gas release valve 25 of the energy storage device 20 respectively, and the first adhesive layer 71 is formed between two first projecting portions 43. Thus, the first adhesive layer 71 is disposed avoiding the positive electrode terminal 23, the negative electrode terminal 24, and the gas release valve 25.

In this embodiment, the first adhesive layer 71 is formed over the whole region in the X axis direction and over the whole region between the two first projecting portions 43. However, the configuration of the first adhesive layer 71 is not limited to the above-mentioned configuration, and a portion where the first adhesive layer 71 is not formed may be partially formed. In FIG. 6, although the first adhesive layer 71 is formed in two regions shown in (a) and (b) in FIG. 6, the number of regions where the first adhesive layer 71 is formed may be set as desired.

As shown in (c) and (d) in FIG. 6 and (b) and (c) in FIG. 7, the second adhesive layer 72 is disposed between the holding member 40 and the side wall 16 of the second outer case 12. The second adhesive layer 72 is a layer made of an adhesive agent for adhering the holding member 40 and the side wall 16 of the second outer case 12 to each other. As the adhesive agent for forming the second adhesive layer 72, an adhesive agent similar to the first adhesive layer 71 can be used.

More specifically, the second adhesive layer 72 is disposed between the side wall recessed portion 16a of the second outer case 12 and the holding member outer peripheral portion 42 of the holding member 40, and makes the side wall recessed portion 16a and the holding member outer peripheral portion 42 adhere to each other. Further more specifically, the second adhesive layer 72 is disposed between the inner surface of the groove portion 16b of the side wall recessed portion 16a and an outer surface of the holding member outer peripheral portion 42 and hence, the inner surface of the groove portion 16b and the outer surface of the holding member outer peripheral portion 42 are fixed to each other by adhesion. That is, an adhesive agent is disposed on the outer surface of the holding member outer peripheral portion 42 or on the inner surface of the groove portion 16b, the holding member outer peripheral portion 42 is fitted in the side wall recessed portion 16a and is inserted into the groove portion 16b, and the adhesive agent is solidified in such a state so that the second adhesive layer 72 is formed.

With such a configuration, the holding member 40 and the side wall 16 of the second outer case 12 are adhered to each other by the second adhesive layer 72 in a second direction which differs from a first direction (Z axis direction). In this embodiment, the second direction is a direction orthogonal to the first direction (Z axis direction). That is, the second direction is the Y axis direction in (c) and (d) in FIG. 6, and the second direction is the X axis direction in (b) and (c) in FIG. 7. That is, the outer periphery of the holding member 40 and the inner periphery of the side wall 16 of the second outer case 12 are adhered to each other by the second adhesive layer 72. More specifically, the outer peripheral surface of the holding member outer peripheral portion 42 and the inner peripheral surface of the groove portion 16b of the side wall recessed portion 16a are adhered to each other by the second adhesive layer 72 in the circumferential direction. In this embodiment, the second adhesive layer 72 is formed over the whole circumference in the circumferential direction. However, the present invention is not limited to such a configuration, and a portion where the second adhesive layer 72 is not formed may be partially provided.

There may be a case where the second adhesive layer 72 disposed as described above flows down from between the inner surface of the groove portion 16b and the outer surface of the holding member outer peripheral portion 42. However, the second adhesive layer 72 is disposed in the inside of the groove portion 16b and hence, the second adhesive layer 72 which flows down from between the inner surface of the groove portion 16b and the outer surface of the holding member outer peripheral portion 42 is accommodated in the inside of the groove portion 16b. The second adhesive layer 72 may be formed in a state where the second adhesive layer 72 is filled in the groove portion 16b by filling the inside of the groove portion 16b with an adhesive agent, and by inserting and adhering the holding member outer peripheral portion 42 into and to the groove portion 16b. In this embodiment, the second direction in which the holding member outer peripheral portion 42 and the groove portion 16b are adhered to each other by the second adhesive layer 72 is a direction orthogonal to the first direction. However, the second direction is not limited to the direction orthogonal to the first direction provided that the second direction is a direction different from the first direction.

As shown in (e) in FIG. 6, the third adhesive layer 73 is disposed between the bottom wall 15 of the second outer case 12 and the energy storage devices 20. The third adhesive layer 73 is a layer made of an adhesive agent for adhering the bottom wall 15 of the second outer case 12 and the energy storage devices 20 to each other. As the adhesive agent for forming the third adhesive layer 73, the same adhesive agent as the first adhesive layer 71 and the second adhesive layer 72 can be used.

More specifically, the third adhesive layer 73 is disposed between the inner surface 15a of the bottom wall 15 of the second outer case 12 and lower surfaces of the bottom surface portions 21a of the containers 21 of the energy storage devices 20, and makes the bottom wall 15 and the bottom surface portions 21a of the containers 21 adhere and fixed to each other. That is, an adhesive agent is disposed between the bottom wall 15 and the bottom surface portions 21a, and the adhesive agent is solidified in a state where the bottom wall projecting portions 15b are brought into contact with the bottom surface portions 21a and hence, the third adhesive layer 73 is formed. With such a configuration, the bottom wall 15 of the second outer case 12 and the energy storage devices 20 are adhered to each other in the first direction (Z axis direction) by the third adhesive layer 73.

In this embodiment, the third adhesive layer 73 is formed over the whole region between the bottom wall 15 of the second outer case 12 and the bottom surface portions 21a of the containers 21 of the energy storage devices 20. However, the present invention is not limited to such a configuration, and a portion where the third adhesive layer 73 is not formed may be partially provided.

As shown in (a) in FIG. 7, the fourth adhesive layer 74 is disposed between the partition portion 17 of the second outer case 12 and the second projecting portion 44 of the holding member body 41 of the holding member 40. The fourth adhesive layer 74 is a layer made of an adhesive agent for adhering the partition portion 17 of the second outer case 12 and the second projecting portion 44 of the holding member 40 to each other. As the adhesive agent for forming the fourth adhesive layer 74, the same adhesive agent as the first adhesive layer 71, the second adhesive layer 72, and the third adhesive layer 73 can be used.

More specifically, the fourth adhesive layer 74 is disposed between the partition portion 17, two energy storage devices 20 which sandwich the partition portion 17 therebetween, and the second projecting portion 44, and makes the partition portion 17 and the second projecting portion 44 fixed to each other by adhesion. That is, an adhesive agent is disposed between two energy storage devices 20 at an upper portion of the partition portion 17, the second projecting portion 44 is inserted between two energy storage devices 20, and the adhesive agent is solidified so that the fourth adhesive layer 74 is formed. With such a configuration, the holding member 40 and the second outer case 12 are adhered to each other in the first direction (Z axis direction) by the fourth adhesive layer 74. In this embodiment, the fourth adhesive layer 74 is formed over the whole region in the Y axis direction. However, the present invention is not limited to such a configuration, and a portion where the fourth adhesive layer 74 is not formed may be partially provided.

The fourth adhesive layer 74 is continuously formed with the first adhesive layer 71. That is, the space where the fourth adhesive layer 74 is disposed and a space where the first adhesive layer 71 is disposed are communicated with each other. With such a configuration, even in a case where either an adhesive agent for forming the fourth adhesive layer 74 or an adhesive agent for forming the first adhesive layer 71 is excessively large in amount, the excessive amount can flow into the other space from one space. Also with respect to the first adhesive layer 71 and the second adhesive layer 72, similarly, a space where the first adhesive layer 71 is disposed and a space where the second adhesive layer 72 is disposed may be communicated with each other.

As has been described above, according to the energy storage apparatus 1 of the embodiment of the present invention, the energy storage devices 20 are disposed at positions where the energy storage devices 20 are sandwiched between the bottom wall 15 of the second outer case 12 and the holding member 40 (insulating member), and the holding member 40 and the energy storage devices 20 are adhered to each other by the first adhesive layer 71, and the holding member 40 and the side wall 16 of the second outer case 12 are adhered to each other by the second adhesive layer 72. With such a configuration, the energy storage devices 20 are adhered to the second outer case 12 by way of the holding member 40 in a state where the energy storage devices 20 are sandwiched by the second outer case 12 and the holding member 40 and hence, the energy storage devices 20 can be firmly fixed to the outer case 10. Further, by reducing the number of parts compared to a case where the energy storage devices 20 are fixed by bolts or the like, the energy storage devices 20 can be firmly fixed to the outer case 10 with ease.

The bottom wall 15 of the second outer case 12 and the energy storage devices 20 are adhered to each other by the third adhesive layer 73 and hence, the energy storage devices 20, the second outer case 12 and the holding member 40 can be fixed to each other. Accordingly, the energy storage devices 20 can be firmly fixed to the outer case 10.

The printed circuit board 50 and the bus bars 60 are fixed to the holding member 40 and hence, it is possible to prevent the movement of the printed circuit board 50 and the bus bars 60 in the inside of the outer case 10. Accordingly, the occurrence of electric disconnection with respect to the printed circuit board 50 and the bus bars 60 can be prevented.

The outer periphery of the holding member 40 and the inner periphery of the side wall 16 of the second outer case 12 are adhered to each other and hence, the second outer case 12 and the holding member 40 can be firmly fixed to each other. Accordingly, the energy storage devices 20 can be firmly fixed to the outer case 10.

The second outer case 12 and the holding member 40 are adhered to each other in a state where the holding member 40 is fitted in the side wall recessed portion 16a of the second outer case 12 and hence, the side wall 16 of the second outer case 12 and the holding member 40 can be firmly fixed to each other. Accordingly, the energy storage devices 20 can be firmly fixed to the outer case 10.

The side wall recessed portion 16a of the second outer case 12 is formed on the inner surface of the side wall 16 and hence, it is possible to prevent the second adhesive layer 72 which is a portion where the side wall 16 of the second outer case 12 and the holding member 40 are adhered to each other from being exposed to the outside. Accordingly, it is possible to suppress the lowering of gas-tightness at the second adhesive layer 72.

The side wall recessed portion 16a of the second outer case 12 has the groove portion 16b which accommodates the second adhesive layer 72 and hence, for example, even when an adhesive agent having low viscosity is used as the second adhesive layer 72, the adhesive agent flows down to the groove portion 16b. Accordingly, it is possible to prevent the adhesive agent from flowing out from the side wall recessed portion 16a.

The holding member 40 has the first projecting portions 43 which are brought into contact with the energy storage devices 20 on the side of the first adhesive layer 71. By forming the first projecting portions 43 such that a projection amount of the first projecting portion 43 is set to an optimum value of a thickness of the first adhesive layer 71, the first adhesive layer 71 can be maintained at an optimum thickness.

The partition portion 17 between the energy storage devices 20 and the second projecting portion 44 of the holding member 40 are fixed to each other and hence, it is possible to prevent contact between the energy storage devices 20. Accordingly, the partition portion 17 and the second projecting portion 44 have an insulation property and hence, the occurrence of shirt-circuiting between the energy storage devices 20 can be prevented. Further, provided that the partition portion 17 and the second projecting portion 44 are made of a material having a heat insulation property, the transfer of heat between the energy storage devices 20 can be prevented.

The first adhesive layers 71 are disposed at the positions different from the positions of both the electrode terminals and the gas release valve 25 which each energy storage device 20 has and hence, it is possible to prevent the first adhesive layers 71 from impairing the functions of the electrode terminals and the function of the gas release valves 25.

By making the direction of adhesion between the holding member 40 and the energy storage devices 20 in the first adhesive layer 71 and the direction of adhesion between the holding member 40 and the second outer case 12 in the second adhesive layer 72 different from each other, the adhesion of these members is minimally dissolved. That is, in a configuration where adhesions are made only in the same direction, the adhesions are easily dissolved by vibrations and an impact in the same direction. With the above-mentioned configuration, the energy storage devices 20 can be firmly fixed to the outer case 10.

(Modifications)

Figure 8A:
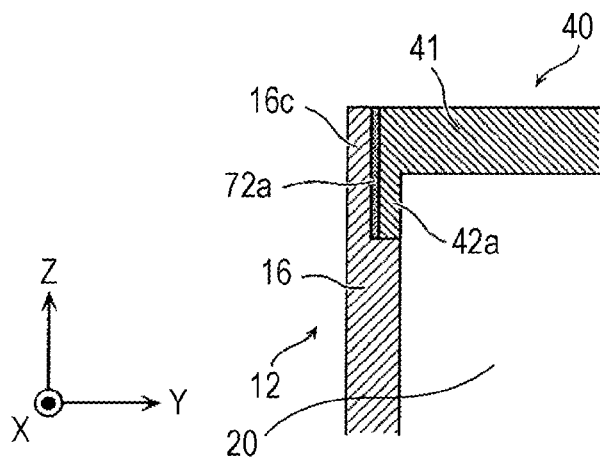
FIG. 8A is a cross-sectional view showing a configuration where a second outer case and a holding member according to a modification 1 of the embodiment are adhered to each other.
Figure 8B:
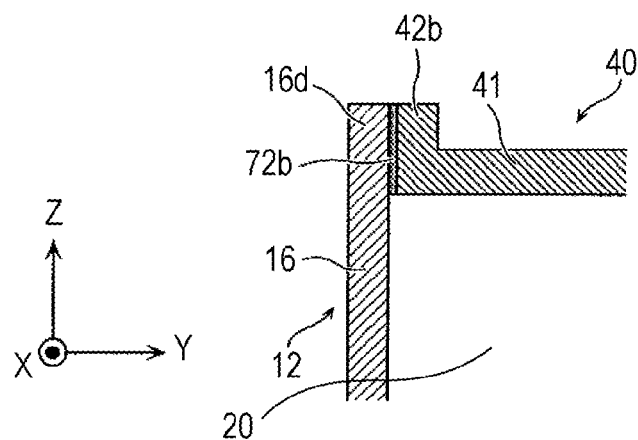
FIG. 8B is a cross-sectional view showing a configuration where a second outer case and a holding member according to a modification 2 of the embodiment are adhered to each other.
Figure 8C:
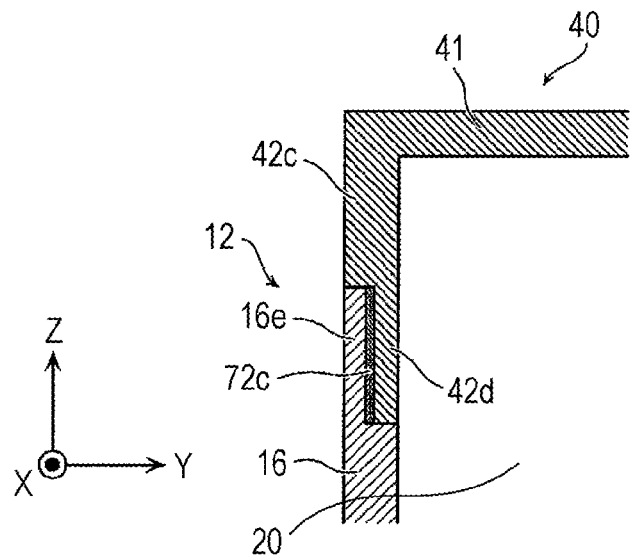
FIG. 8C is a cross-sectional view showing a configuration where a second outer case and a holding member according to a modification 3 of the embodiment are adhered to each other.

Next, modifications of the above-mentioned embodiment are described. FIG. 8A, FIG. 8B and FIG. 8C are cross-sectional views showing the configurations where a second outer case 12 and a holding member 40 are adhered to each other in the modifications 1 to 3 of the embodiment. These drawings correspond to (c) in FIG. 6.

Firstly, as shown in FIG. 8A, the second outer case 12 according to the modification 1 has a side wall recessed portion 16c in place of the side wall recessed portion 16a of the second outer case 12 according to the above-mentioned embodiment. Further, the holding member 40 according to the modification 1 has a holding member outer peripheral portion 42a in place of the holding member outer peripheral portion 42 of the holding member 40 according to the above-mentioned embodiment. Other configurations of the modification 1 are substantially similar to the corresponding configuration of the above-mentioned embodiment and hence, their detailed description is omitted.

The side wall recessed portion 16c does not have a groove portion which corresponds to the groove portion which the side wall recessed portion 16a according to the above-mentioned embodiment has, and the holding member outer peripheral portion 42a is fitted in the side wall recessed portion 16c. A second adhesive layer 72a is disposed between an inner surface of the side wall recessed portion 16c and an outer surface of the holding member outer peripheral portion 42a, and the side wall recessed portion 16c and the holding member outer peripheral portion 42a are adhered to each other. The second adhesive layer 72a may be disposed between the outer periphery of the holding member outer peripheral portion 42a and the inner periphery of the side wall recessed portion 16c over the whole circumference or a portion where the second adhesive layer 72a is not formed may be partially provided.

As described above, the energy storage apparatus according to the modification 1 also can acquire substantially the same advantageous effect as the energy storage apparatus 1 according to the above-mentioned embodiment. Particularly, a groove portion is not formed on the side wall recessed portion 16c and hence, a configuration of the second outer case 12 can be simplified.

As shown in FIG. 8B, the second outer case 12 according to the modification 2 has a side wall end portion 16d in place of the side wall recessed portion 16a of the second outer case 12 according to the above-mentioned embodiment. The holding member 40 according to the modification 2 has a holding member outer peripheral portion 42b in place of the holding member outer peripheral portion 42 of the holding member 40 according to the above-mentioned embodiment. The other configuration of the modification 2 is substantially similar to the corresponding configuration of the above-mentioned embodiment and hence, their detailed description is omitted.

A side wall end portion 16d forms an upper end portion of a side wall 16, and does not form the recessed portion as in the above-mentioned embodiment. A holding member outer peripheral portion 42b is an annular portion which projects upward from an outer edge of a holding member body 41, and projects such that a height of an upper surface of the holding member outer peripheral portion 42b becomes equal to a height of an upper surface of the side wall end portion 16d. In such a configuration, the holding member outer peripheral portion 42b is fitted in the side wall end portion 16d. A second adhesive layer 72b is disposed between an inner surface of the side wall end portion 16d and an outer surface of the holding member outer peripheral portion 42b so that the side wall end portion 16d and the holding member outer peripheral portion 42b are adhered to each other. The second adhesive layer 72b may be disposed between the outer periphery of the holding member outer peripheral portion 42b and the inner periphery of the side wall end portion 16d over the whole circumference, or a portion where the second adhesive layer 72b is not formed may be partially provided.

As described above, the energy storage apparatus according to the modification 2 also can acquire substantially the same advantageous effect as the energy storage apparatus 1 according to the above-mentioned embodiment. Particularly, a recessed portion is not formed on the side wall 16 and hence, the configuration of the second outer case 12 can be further simplified.

As shown in FIG. 8C, the second outer case 12 according to the modification 3 has a side wall recessed portion 16e in place of the side wall recessed portion 16a of the side wall 16 of the second outer case 12 according to the above-mentioned embodiment. The holding member 40 according to the modification 3 has a holding member outer peripheral portion 42c in place of the holding member outer peripheral portion 42 of the holding member 40 according to the above-mentioned embodiment. The other configuration of the modification 3 is substantially similar to the corresponding configuration of the above-mentioned embodiment and hence, their detailed description is omitted.

Similar to the above-mentioned modification 1, the side wall recessed portion 16e does not have a groove portion corresponding to the groove portion which the side wall recessed portion 16a according to the above-mentioned embodiment has. The holding member outer peripheral portion 42c is an annular portion having a holding member recessed portion 42d which is formed by denting an outer surface of the holding member outer peripheral portion 42c. In such a configuration, the holding member 40 is disposed above the second outer case 12, the holding member recessed portion 42d is disposed inward the side wall recessed portion 16e, and the second outer case 12 and the holding member 40 are engaged with each other by fitting. A second adhesive layer 72c is disposed between an inner surface of the side wall recessed portion 16e and an outer surface of the holding member recessed portion 42d so that the side wall recessed portion 16e and the holding member recessed portion 42d are adhered to each other. The second adhesive layer 72c may be disposed between the outer periphery of the holding member recessed portion 42d and the inner periphery of the side wall recessed portion 16e over the whole circumference, or a portion where the second adhesive layer 72c is not formed may be partially provided.

As described above, the energy storage apparatus according to the modification 3 also can acquire substantially the same advantageous effect as the energy storage apparatus 1 according to the above-mentioned embodiment. Particularly, the energy storage apparatus according to the modification 3 can also adopt a configuration where the holding member 40 is disposed above the second outer case 12 and hence, the energy storage apparatus according to the modification 3 is adaptable to outer cases having various configurations.

Although the energy storage apparatus according to the embodiment of the present invention and the modifications of the embodiment have been described heretofore, the present invention is not limited to the above-mentioned embodiment and the modifications of the embodiment. That is, it should be construed that the embodiment and the modifications of the embodiment disclosed in this specification are only for an exemplifying purpose in all aspects and are not limited. The scope of the present invention is not designated by the above-mentioned description but is designated by Claims, and it is intended that all modifications which fall within the meaning and the scope equivalent to Claims are also included in the scope of the present invention.

For example, in the above-mentioned embodiment and the modifications of the embodiment, the energy storage apparatus includes the outer case 10 having the first outer case 11 and the second outer case 12. However, the outer case 10 may not have the first outer case 11. In this case, the positive electrode external terminal 13 and the negative electrode external terminal 14 mounted on the first outer case 11 may be directly mounted on the bus bars 60 respectively, or the bus bars 60 may have a function of external terminals.

In the above-mentioned embodiment and the modifications of the embodiment, the holding member 40 is an insulating member made of an insulating material. However, it is sufficient for the holding member 40 that at least a portion of the holding member 40 is made of an insulating material. For example, the holding member 40 may be an insulating member in which a metal member is formed by insert molding.

In the above-mentioned embodiment and the modifications of the embodiment, the energy storage apparatus includes the third adhesive layer 73 by which the bottom wall 15 of the second outer case 12 and the energy storage devices 20 are adhered to each other. However, the bottom wall 15 of the second outer case 12 and the energy storage devices 20 may not be adhered to each other. For example, the energy storage devices 20 may be fixed to the second outer case 12 by being pressed by the holding member 40 from above.

In the above-mentioned embodiment and the modifications of the embodiment, the energy storage apparatus includes both the printed circuit board 50 and the bus bars 60, and both the printed circuit board 50 and the bus bars 60 are fixed to the holding member 40. However, the energy storage apparatus may include only either the printed circuit board 50 or the bus bars 60, and the either the printed circuit board 50 or the bus bars 60 may be fixed to the holding member 40. Although the energy storage apparatus includes both the printed circuit board 50 and the bus bars 60, the energy storage apparatus may be configured such that only either the printed circuit board 50 or the bus bars 60 is/are fixed to the holding member 40. Alternatively, irrespective of whether the energy storage apparatus includes the printed circuit board 50 and the bus bars 60 or not, the energy storage apparatus may be configured such that neither the printed circuit board 50 nor the bus bars 60 are fixed to the holding member 40.

In the above-mentioned embodiment and the modifications of the embodiment, the outer periphery of the holding member 40 and the inner periphery of the side wall 16 of the second outer case 12 are adhered to each other by the second adhesive layer 72. However, the second outer case 12 may be disposed inside the holding member 40, and the inner periphery of the holding member 40 and the outer periphery of the side wall 16 of the second outer case 12 may be adhered to each other by the second adhesive layer 72.

In the above-mentioned embodiment and the modifications of the embodiment, the holding member 40 has the first projecting portions 43 and the second projecting portions 44, and the second outer case 12 has the bottom wall projecting portions 15b. However, the energy storage apparatus may not have some or all of these projecting portions.

In the above-mentioned embodiment and the modifications of the embodiment, the partition portion 17 of the second outer case 12 is disposed between each two of energy storage device groups each of which is formed of the plurality of energy storage devices 20 connected parallel to each other. However, the partition portion 17 may be disposed between each two of the energy storage devices 20 in the energy storage device group, and the arrangement positions of the partition portions 17 are not particularly limited.

In the above-mentioned embodiment and the modifications of the embodiment, the energy storage device 20 includes the electrode terminals (the positive electrode terminal 23 and the negative electrode terminal 24) and the gas release valve 25 on the container lid portion 22. However, the energy storage device 20 may include either the electrode terminals or the gas release valve 25 on a surface other than the container lid portion 22 of the container 21. That is, it is sufficient that at least either the electrode terminals or the gas release valve 25 are/is disposed on a surface of the container 21 on a first adhesive layer 71 side. In this case, it is sufficient that the first adhesive layers 71 are disposed at positions different from the position of at least either the electrode terminals or the gas release valve 25. Alternatively, neither the electrode terminals nor the gas release valve 25 may be disposed on the surface of the container 21 on the first adhesive layer 71 side.

In the above-mentioned embodiment and the modifications of the embodiment, the first adhesive layer 71, the third adhesive layer 73 and the fourth adhesive layer 74 are formed by adhesion in the same direction, and the second adhesive layer 72 is formed by adhesion in the direction different from the direction of adhesion in forming the first adhesive layer 71, the third adhesive layer 73 and the fourth adhesive layer 74. However, directions in forming these adhesive layers by adhesion are not limited to such directions. The adhesion direction of any one of adhesive layers may differ from the adhesion directions of other adhesive layers, or all adhesive layers may have the same adhesion direction.

In the above-mentioned embodiment and the modifications of the embodiment, the first adhesive layer 71, the second adhesive layer 72, the third adhesive layer 73, and the fourth adhesive layer 74 are respectively formed of an adhesive layer made of an adhesive agent. However, a material for forming these adhesive layers is not limited to an adhesive agent, and either one of or all of these adhesive layers may be a double-sided adhesive tape or an adhesive layer having a detachably hook-and-loop fastener structure which is referred to as the Magic Tape (registered trademark), the Velcro (registered trademark) or the like. Alternatively, either one of or all of these adhesive layers may be a heat fusing layer where parts are fused each other. For example, it is considered that the holding member 40 and the side wall 16 of the second outer case 12 are fused by heat fusing and are integrally formed with each other so that the second adhesive layer 72 is formed. When the outer surface of the container 21 of the energy storage device 20 is made of a resin, it is safe to say that the first adhesive layer 71 and the third adhesive layer 73 are formed similarly. Also the fourth adhesive layer 74 may be formed similarly.

The configurations which are formed by arbitrarily combining the respective constitutional elements which the above-mentioned embodiment and the modifications of the embodiment include are also included in the scope of the present invention.

The present invention is applicable to an energy storage apparatus including an energy storage device such as a lithium ion secondary battery or the like.

What is claimed is:
1. An energy storage apparatus, comprising:
an outer case including a bottom wall and a side wall;
energy storage devices, each energy storage device including an upper surface that faces opposite to the bottom wall, the upper surface including a lid portion that covers an opening of the each energy storage device;
an insulating member disposed at a position where the energy storage devices are sandwiched between the bottom wall and the insulating member, the insulating member including a first projecting portion which projects toward the energy storage devices;
a first adhesive layer which makes the insulating member and the energy storage devices adhere to each other, the first adhesive layer being formed on and over the upper surfaces of the energy storage devices, the energy storage devices being disposed adjacently to each other; and
a second adhesive layer which makes the insulating member and the side wall adhere to each other,
wherein, above the lid portion, the first projecting portion extends at a position adjacent to the first adhesive layer.

2. The energy storage apparatus according to claim 1, wherein the energy storage apparatus further comprises a third adhesive layer which makes the bottom wall and the energy storage devices adhere to each other.

3. The energy storage apparatus according to claim 1, wherein the energy storage apparatus further comprises at least one of a printed circuit board and a bus bar, and
wherein the at least one of the printed circuit board and the bus bar is fixed to the insulating member.

4. The energy storage apparatus according to claim 1, wherein an outer periphery of the insulating member and an inner periphery of the side wall are adhered to each other by the second adhesive layer.

5. The energy storage apparatus according to claim 1, Wherein the side wall includes a recessed portion in which the insulating member is fitted, and
wherein the second adhesive layer makes the recessed portion and the insulating member adhere to each other.

6. The energy storage apparatus according to claim 5, wherein the recessed portion is formed on an inner surface of the side wall.

7. The energy storage apparatus according to claim 5, wherein the recessed portion includes a groove portion which accommodates the second adhesive layer.

8. The energy storage apparatus according to claim 1, wherein, above the lid portion, the first projecting portion is brought into contact with the energy storage devices at the position adjacent to the first adhesive layer.

9. The energy storage apparatus according to claim 1, wherein the energy storage apparatus further comprises a partition portion disposed between the energy storage devices,
wherein the insulating member includes a second projecting portion which projects toward the partition portion, and
wherein the partition portion is fixed to the second projecting portion.

10. The energy storage apparatus according to claim 1, wherein the each energy storage device further includes at least one of an electrode terminal and a gas release valve, and
wherein the first adhesive layer is disposed at a position different from a position of the at least one of the electrode terminal and the gas release valve.

11. The energy storage apparatus according to claim 1, wherein the first adhesive layer makes the insulating member and the energy storage devices adhere to each other in a first direction, and
wherein the second adhesive layer makes the insulating member and the side wall adhere to each other in a second direction which differs from the first direction.

12. The energy storage apparatus according to claim 1, wherein an electrode terminal protrudes from the lid portion in a stacking direction, the first projecting portion extends away from an upper surface of the lid portion in the stacking direction, and
wherein, above the lid portion, the electrode terminal, the first projecting portion, and the first adhesive layer are arranged sequentially in the stacking direction.

13. The energy storage apparatus according to claim 1, wherein the each energy storage device further includes a gas release valve disposed on the lid portion, and
wherein, above the lid portion, the first projecting portion extends between the first adhesive layer and the gas release valve.

14. The energy storage apparatus according to claim 1, wherein the insulating member is disposed on a top surface of the first adhesive layer.

15. The energy storage apparatus according to claim 14, wherein, above the lid portion, the first projecting portion of the insulating member is disposed on a side surface of the first adhesive layer.

16. The energy storage apparatus according to claim 1, wherein, above the lid portion, the first projecting portion of the insulating member abuts a side surface of the first adhesive layer.

17. An energy storage apparatus, comprising:
an outer case including a bottom wall and a side wall;
energy storage devices, each energy storage device including an upper surface that faces opposite to the bottom wall, the upper surface including a lid portion that covers an opening of the each energy storage device;
an insulating member disposed at a position where the energy storage devices are sandwiched between the bottom wall and the insulating member, the insulating member including a projecting portion which projects toward the energy storage devices; and
an adhesive layer which adheres the insulating member and the energy storage devices to each other,
wherein, above the lid portion, the projecting portion extends at a position adjacent to the adhesive layer.

18. The energy storage apparatus according to claim 17, wherein an electrode terminal protrudes from the lid portion in a stacking direction, the projecting portion extends away from an upper surface of the lid portion in the stacking direction, and
wherein, above the lid portion, the electrode terminal, the projecting portion, and the adhesive layer are arranged sequentially in the stacking direction.

19. The energy storage apparatus according to claim 17, wherein the each energy storage device further includes a gas release valve disposed on the lid portion, and
wherein, above the lid portion, the projecting portion extends between the adhesive layer and the gas release valve.

20. The energy storage apparatus according to claim 17, wherein the insulating member is disposed on a top surface of the adhesive layer, and
wherein, above the lid portion, the projecting portion of the insulating member is disposed on a side surface of the adhesive layer.

* * * * *